US006231626B1

(12) United States Patent
Yoshida et al.

(10) Patent No.: US 6,231,626 B1
(45) Date of Patent: May 15, 2001

(54) METHOD OF PRODUCING A LITHIUM ION SECONDARY BATTERY AND A LITHIUM ION SECONDARY BATTERY PRODUCED THEREBY

(75) Inventors: Yasuhiro Yoshida; Kouji Hamano; Takayuki Inuzuka; Michio Murai; Hisashi Shiota; Shigeru Aihara; Syo Shiraga, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/018,016

(22) Filed: Feb. 3, 1998

(30) Foreign Application Priority Data

Feb. 4, 1997 (JP) .................................................... 9-021699
Dec. 5, 1997 (JP) .................................................... 9-335660

(51) Int. Cl.[7] .................................................. H01M 10/40

(52) U.S. Cl. ............................................ 29/623.5; 429/217
(58) Field of Search ............................. 429/217; 29/623.5

(56) References Cited

U.S. PATENT DOCUMENTS 6,024,773 * 2/2000 Inuzuka et al. .

* cited by examiner

*Primary Examiner*—John S. Maples
(74) *Attorney, Agent, or Firm*—Oblon, Spivak, McClelland, Maier & Neustadt, P.C.

(57) ABSTRACT

A paste-like active material mixture prepared by mixing an active material powder and a particulate material comprising a polymer soluble in a nonaqueous electrolytic solution is applied to, e.g., collectors 1c and 2c to a uniform thickness, and then dried to form positive and negative electrodes 1, 2 containing an active material powder and a particulate polymer. The two electrodes are assembled into an electrode laminate into which the foregoing electrolytic solution is then injected.

8 Claims, 2 Drawing Sheets

METHOD OF PRODUCING A LITHIUM ION SECONDARY BATTERY AND A LITHIUM ION SECONDARY BATTERY PRODUCED THEREBY

BACKGROUND OF THE INVENTION

1. Field of the Invention

The present invention relates to a method of producing a lithium ion secondary battery comprising a nonaqueous electrolytic solution and more particularly to a method of producing and the structure of a safe lithium ion battery having a high charge-discharge efficiency comprising a low fluidity or gelled electrolytic solution.

2. Description of the Related Art

Portable electronic apparatus have found a very great demand for reduced size and weight. The accomplishment of the demand greatly depends on the enhancement of the properties of the battery to be mounted in these portable electronic apparatus. In order to meet this demand, the development and improvement of various batteries are under way. In particular, a lithium battery is a secondary battery which can realize the highest voltage, energy density and load resistance in the existing batteries. The improvement of lithium batteries is still under way.

FIG. 1 is a schematic sectional view illustrating the structure of an ordinary lithium ion secondary battery which has been put into practical use. The lithium ion secondary battery comprises as essential constituents a positive electrode 1, a negative electrode 2, and an ionically-conducting layer 3 provided interposed therebetween. In this lithium ion secondary battery, as the positive electrode 1 there is used a plate-like material prepared by applying a mixture of an active positive electrode material powder 1a such as lithium-cobalt composite oxide, an electrically-conducting powder 1b and a binder resin to a positive electrode collector 1c. Similarly, as the negative electrode 2 there is used a plate-like material prepared by applying a mixture of a carbon-based negative electrode active material powder 2a and a binder resin to a negative electrode collector 2c made of copper. As the ionically-conducting layer 3 there is used a separator made of a porous film of polyethylene or polypropylene filled with a nonaqueous electrolytic solution containing lithium ion. The battery structure of the present example comprises a single electrode laminate 4 having a separator laminated with an electrode.

The lithium ion battery comprising such a nonaqueous electrolytic solution is liable to rise in the danger of sparking, heat generation, etc. due to internal or external shortcircuiting caused by the rise in battery capacity. The rise in battery capacity faces a great apprehension that the battery might ignite. The elimination of this danger can be effectively accomplished by the reduction of the fluidity of the electrolytic solution. However, since the lithium ion battery comprises a porous electrode formed by coagulating a particulate active material, it is very difficult for an electrolytic solution having a reduced fluidity to fill thoroughly microvoids in the electrode. On the other hand, it is necessary that the microvoids in the electrode be filled with an electrolytic solution to improve the battery properties.

Further, gelled electrolytes have been of interest and under extensive study for practical use from the standpoint of the reduction of the thickness of batteries. However, the gelled electrolytes, too, cannot be easily injected into the electrode. It is thus very difficult for the gelled electrolytes to fill thoroughly voids in the electrode. Batteries comprising a gelled electrolyte are disclosed in U.S. Pat. No. 5,460,904, "Nikkei Microdevice", Nikkei BP, August 1996, page 136, etc.

As mentioned above, it is not easy for any electrolytic solution to fill thoroughly microvoids in the electrode. Thus, the production of such a battery faces a problem that it is difficult to fill thoroughly voids in the electrode. This makes it impossible to provide a safe lithium ion secondary battery having a high charge-discharge efficiency.

SUMMARY OF THE INVENTION

The present invention has been worked out as a result of the inventors' extensive studies of the filling of electrolytes. An object of the present invention is to provide a production process by which a safe lithium ion battery having an excellent charge-discharge efficiency comprising a low fluidity or gelled electrolytic solution can be easily obtained and a lithium ion secondary battery having a structure that can enhance the charge-discharge efficiency thereof.

The first aspect of the method of producing a lithium ion secondary battery is a method, which comprises the steps of:

preparing an active material mixture by mixing an active material powder with a particulate polymer soluble in a nonaqueous electrolytic solution;

forming electrodes comprising said active material powder and particulate material by using the active material mixture as a raw material;

assembling said electrodes into an electrode laminate;

and then injecting said electrolytic solution into said electrode laminate.

The second aspect of the present invention is a method according to the first aspect of the present invention, wherein said particulate polymer soluble in a nonaqueous electrolytic solution comprises at least one of methacrylic polymer, acrylic polymer, polyethylene glycol, polypropylene glycol, and a copolymer obtained by the copolymerization of these polymers with other monomers.

The third aspect of the present invention is a method according to the first aspect of the present invention, wherein the method further comprises the step of introducing the particulate polymer soluble in a nonaqueous electrolytic solution externally into voids in said electrode before the step of assembling into the electrode laminate.

The fourth aspect of the present invention is a method according to the first aspect of the present invention, wherein the method further comprises the steps of:

coating said electrode with or dipping in a solution of said polymer soluble in a nonaqueous electrolytic solution;

and then drying before the step of assembling into the electrode laminate.

The fifth aspect of the present invention is a method according to the fourth aspect of the present invention, wherein said active material mixture further comprises a binder resin and the method further comprises the step of heating said electrodes at the temperature in which said particulate polymer is melt and said binder resin is not melt.

The sixth aspect of the present invention is a method according to the fifth aspect of the present invention, wherein said particulate polymer comprises at least one of polyethylene glycol and polypropylene glycol and the step of heating said electrodes is the step of heating them at 80° C.

The seventh aspect of the present invention is a method according to the first aspect of the present invention, wherein a diameter of said particulate polymer is not larger than 20 μm.

The eighth aspect of the present invention is a method according to the seventh aspect of the present invention, wherein a diameter of said particulate polymer is not larger than 5 μL m.

The ninth aspect of the present invention is a method according to the present invention, which comprises the steps of:

forming electrodes comprising an active material layer;
introducing a particulate polymer soluble in a nonaqueous electrolytic solution externally into voids in said electrode;
assembling said electrodes into the electrode laminate;
and then injecting said electrolytic solution into said battery structure.

The tenth aspect of the present invention is a method according to the ninth aspect of the present invention, wherein the step of introducing the particulate polymer comprises externally introducing a particulate polymer soluble in said nonaqueous electrolytic solution into voids in said electrodes which comprise active material layers formed of an active material powder to prepare an electrode comprising said particulate material in voids.

The eleventh aspect of the present invention is a method according to the tenth aspect of the present invention, wherein the step of introducing the particulate polymer is performed by supplying said electrodes into the particulate polymer and vibrating the particulate polymer.

The twelfth aspect of the present invention is a method according to the tenth aspect of the present invention, wherein the step of introducing the particulate polymer is performed by coating said electrode with or dipping in a solution of said polymer soluble in a nonaqueous electrolytic solution;
and then drying before the step of assembling into the electrode laminate.

The thirteenth aspect of the present invention is a method according to the tenth aspect of the present invention, wherein a diameter of said particulate polymer is not larger than 20 µm.

The fourteenth aspect of the present invention is a method according to the thirteenth aspect of the present invention, wherein a diameter of said particulate polymer is not larger than 5 µm.

The fifteenth aspect of the lithium ion secondary battery is a battery of the present invention, which comprises two opposing electrodes and a separator provided interposed therebetween, and a nonaqueous electrolytic solution retained in voids in said electrodes and said separator, wherein a gelling material is incorporated in said electrodes so that the viscosity or gelation degree of said nonaqueous electrolytic solution is higher toward said separator.

The sixteenth aspect of the lithium ion secondary battery is a battery of the fifteenth aspect, which comprises a plurality of electrode laminates.

The seventeenth aspect of the lithium ion secondary battery is a battery of the sixteenth aspect, wherein said plurality of electrode laminates are formed by alternately arranging a positive electrode and a negative electrode between a plurality of separated separators.

The eighteenth aspect of the lithium ion secondary battery is a battery of the sixteenth aspect, wherein said plurality of electrode laminates are formed by alternately arranging a positive electrode and a negative electrode between the gap of a wound separator.

The nineteenth aspect of the lithium ion secondary battery is a battery of the sixteenth aspect, wherein said plurality of electrode laminates are formed by alternately arranging a positive electrode and a negative electrode between the gap of a folded separator.

DESCRIPTION OF THE PREFERRED EMBODIMENTS

Figure 1:
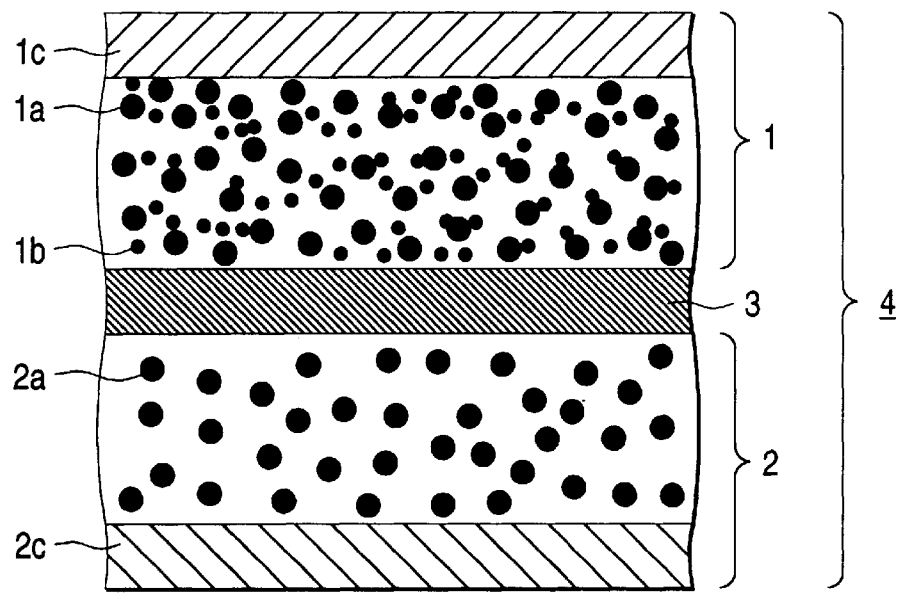
FIG. 1 is schematic sectional view illustrating the structure and electrode laminate of an ordinary lithium ion battery according to the present invention.

In the first method of producing a lithium ion secondary battery of the present invention, a paste-like active material mixture prepared by mixing an active material powder and a particulate material comprising a polymer soluble in a nonaqueous electrolytic solution is applied to a collector to a uniform thickness, and then dried to prepare an electrode comprising the active material powder and particulate material. The electrode thus prepared is then assembled into a battery structure comprising an electrode laminate 4 having a separate provided interposed between a positive electrode and a negative electrode as shown in FIG. 1. The foregoing electrolytic solution is then injected into the battery structure.

In the case of the first method, the electrode has previously comprised a particulate polymer soluble in a nonaqueous electrolytic solution incorporated therein, making it easy for an electrolytic solution having a reduced viscosity to be injected into and fill voids in the electrode. The dissolution of the polymer in the electrolytic solution which has thus been injected makes it possible to render the electrolytic solution highly viscous or gel the electrolytic solution. Thus, it can be easily made possible to fill up microvoids in the electrode with a highly viscous or gelled electrolytic solution which exhibits a reduced fluidity that can reduces danger. Further, the polymer also serves as an adhesive that can enhance the strength of the electrode. Moreover, since the particulate polymer is introduced into the electrode together with an active material during the preparation of the electrode, it can be incorporated in the electrode in a desired amount over the entire region in the electrode, making it easy to adjust the viscosity and gelation degree of the electrolytic solution.

Thus, a safe lithium ion battery having an excellent charge-discharge efficiency comprising a low fluidity or gelled electrolytic solution can be easily obtained.

In this case, the active material mixture preferably comprises a binder resin, an organic solvent, a electrically-conducting particulate material, etc. incorporated therein in a proper amount besides the active material powder and the particulate material comprising a polymer soluble in an electrolytic solution. The present method has been described with reference to the application of the active material mixture to a collector which is then formed into an electrode plate. However, it is not always necessary to use a collector.

The second method of producing a lithium ion secondary battery of the present invention comprises subjecting the electrode comprising a particulate polymer uniformly incorporated therein obtained in the foregoing first method to oscillation in a particulate material comprising a polymer soluble in a nonaqueous electrolytic solution or like treatment so that the particulate polymer is externally introduced into voids in the electrode, assembling the electrode comprising a particulate polymer incorporated also in its voids into a battery structure, and then injecting the nonaqueous electrolytic solution into the battery structure.

In addition to the same effect as exerted by the foregoing first method, the third method exerts the following effects. In some detail, the further external introduction of a particulate polymer into the electrode comprising a particulate polymer incorporated therein uniformly over the entire region thereof causes the distribution of the particulate polymer in the electrode to be scattered, making it possible to change the viscosity or gelation degree of the electrolytic solution depending on the site in the electrode. By changing the viscosity or gelation degree of the electrolytic solution in voids in the electrode depending on the site in the electrode, the charge-discharge characteristics of the electrode which acts as a battery can be affected.

In other words, important factors determining the charge-discharge efficiency of batteries include the efficiency of doping and dedoping of lithium ion during charging and discharging of active material. In an ordinary battery structure, the ease of migration of lithium ion is uniform in the electrolytic solution. Therefore, doping and dedoping of lithium ion occur particularly in the vicinity of the surface of the electrode close to the separator. Thus, the active material in the electrode cannot be effectively used, making it impossible to provide desired charge-discharge characteristics. It is thought, on the other hand, that as in the lithium ion secondary battery according to the present invention, by raising the viscosity or gelation degree of the nonaqueous electrolytic solution in the electrode toward the separator, the difference in the doping and dedoping rates in the positive and negative electrode active material layers between on the separator side and inside the active material can be relaxed, making it possible to effectively use the active material inside the electrode and hence improve the charge-discharge characteristics of the battery.

Accordingly, by raising the viscosity or gelation degree of the nonaqueous electrolytic solution in the electrode toward the separator, the charge-discharge characteristics of the battery can be further improved. In accordance with the present method, a battery having the constitution of the present invention, i.e., a safe battery which comprises a nonaqueous electrolytic solution having a higher viscosity or gelation degree in the electrode toward the separator and hence exhibits better charge-discharge characteristics can be easily obtained.

The fourth method of producing a lithium ion secondary battery of the present invention comprises coating the electrode comprising a particulate polymer uniformly incorporated therein obtained in the foregoing first method with or dipping the electrode in a solution of a polymer soluble in a nonaqueous electrolytic solution, drying the electrode, assembling the electrode thus dried into a battery structure, and then injecting the foregoing electrolytic solution into the battery structure.

In the present method, the application of the polymer solution to the electrode or the dipping of the electrode in the polymer solution makes it possible to further introduce the polymer into voids in the electrode comprising a particulate polymer uniformly incorporated therein. Thus, the present method exerts the same effect as in the foregoing third method.

The tenth method of producing a lithium ion secondary battery of the present invention comprises forming an active material powder into an electrode, subjecting the electrode to oscillation in a particulate material comprising a polymer soluble in a nonaqueous electrolytic solution or like treatment so that the particulate polymer is externally introduced into voids in the electrode, assembling the electrode comprising a particulate polymer incorporated in its voids into a battery structure, and then injecting the nonaqueous electrolytic solution into the battery structure. In accordance with the present method, the electrolytic solution can be rendered highly viscous or gelled. Further, the distribution of the particulate polymer in the electrode can be scattered. Thus, the viscosity or gelation degree of the electrolytic solution can be changed depending on the site in the electrode. Accordingly, a battery having the constitution of the present invention, i.e., a safe lithium ion battery comprising a low fluidity or gelled electrolytic solution and having an excellent charge-discharge efficiency can be easily obtained.

The electrode formed of an active material mixture powder may comprise a binder resin, an organic solvent, an electrically-conducting particulate material, etc. incorporated in the active material powder as necessary. These additives may be applied to the collector which is then formed into an electrode plate.

The twelfth method of producing a lithium ion secondary battery of the present invention comprises coating an electrode formed of an active material powder with or dipping the electrode in a solution of a polymer soluble in a nonaqueous electrolytic solution, drying the electrode, assembling the electrode thus dried into a battery structure, and then injecting the electrolyte into the battery structure. The application of the polymer solution to the electrode or the dipping of the electrode in the polymer solution makes it possible to externally introduce the polymer into voids in the electrode. Thus, the present method exerts the same effect as in the tenth method.

As the polymer soluble in the electrolytic solution employable in the present invention there may be used a polyether polymer such as methacrylic polymer, acrylic polymer, polyethylene glycol and polypropylene glycol, a polymer obtained by the copolymerization of these polymers with other monomers or such a polymer comprising various additives such as crosslinking agent optionally incorporated therein.

The particulate polymer to be mixed with an active material powder which is then formed into an electrode has a grain diameter of not more than 20 $\mu$m, preferably not more than 5 $\mu$m. If the grain diameter of the particulate polymer is too great, the particulate polymer is unevenly dissolved in the electrolytic solution with which the electrode is impregnated. The grain diameter of the particulate polymer to be externally introduced into voids in the electrode formed of an active material powder is not more than 1 $\mu$m, preferably not more than 0.2 $\mu$m.

As the positive electrode active material employable herein there may be used an oxide of lithium with a transition metal such as cobalt, nickel and manganese, a chalcogen compound containing lithium, a composite compound thereof, a chalcogen compound containing the foregoing oxide and lithium, or such a composite compound comprising various additive elements incorporated therein. As the negative electrode active material employable herein there may be preferably used a carbon-based compound such as easily graphitized carbon, difficultly graphitized carbon, polyacene and polyacetylene or an aromatic hydrocarbon compound having an acene structure such as pyrene and perylene. In practice, however, any materials capable of occluding and releasing lithium ion, which plays an essential role in the battery operation, may be used. Such an active material is used in a particulate form. The grain diameter of the active material is preferably within a range from 0.3 to 20 $\mu$m, particularly from 1 to 5 $\mu$m. If the grain diameter of the active material is too small, there occur too few voids in the electrode thus formed. Further, the surface area of the active material coated by an adhesive (binder resin) during the formation of an electrode is too great. Thus, doping and dedoping of lithium ion during charging/discharging cannot be efficiently effected, deteriorating the battery properties. On the contrary, if the grain diameter of the active material is too small, the thickness of the electrode cannot be easily reduced. Further, the packing density of the active material is reduced.

As the electrolytic solution there may be used an electrolyte salt containing lithium dissolved in a nonaqueous solvent used in conventional batteries. Specific examples of the nonaqueous solvent employable herein include ether solvents such as dimethoxyethane, diethoxyethane, diethyl ether and dimethyl ether, and ester solvents such as ethylene carbonate, propylene carbonate, diethyl carbonate and dimethyl carbonate. These solvents may be used singly. Alternatively, two of these same or different kinds of solvents may be used in admixture. As the electrolyte salt to be used for the electrolytic solution there may be used $LiPF_6$, $LiAsF_6$, $LiClO_4$, $LiBF_4$, $LiCF_3SO_3$, $LiN(CF_3SO_2)_2$, $LiC(CF_3SO_2)_3$ or the like.

As the collector there may be used any metal which stays stable in the battery. For the positive electrode, aluminum is preferably used. For the negative electrode, copper is preferably used. The collector may be used in any form selected from the group consisting of foil, net and expanded metal. In practice, however, the collector is preferably in a form having a great void area such as net and expanded metal because such a form helps the collector to be impregnated with the electrolytic solution after bonded to the electrode.

Figure 2:
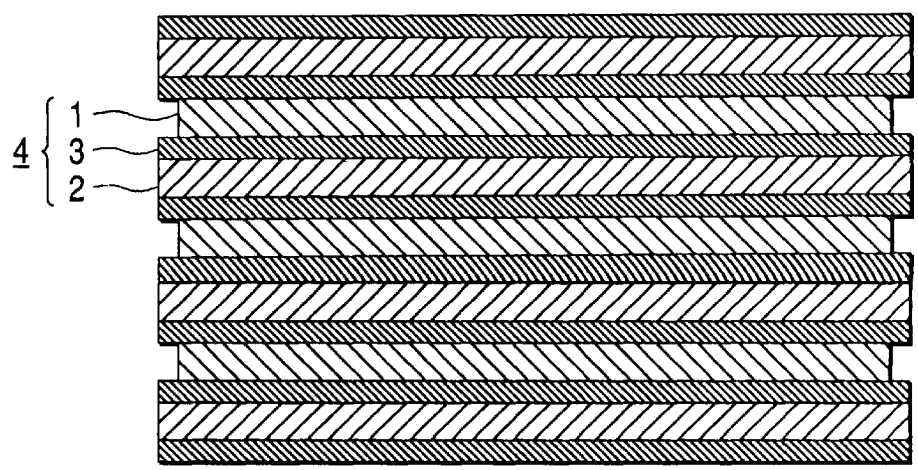
FIG. 2 is a schematic sectional view illustrating the multi-layer structure of another embodiment of the lithium ion battery according to the present invention.
Figure 3:
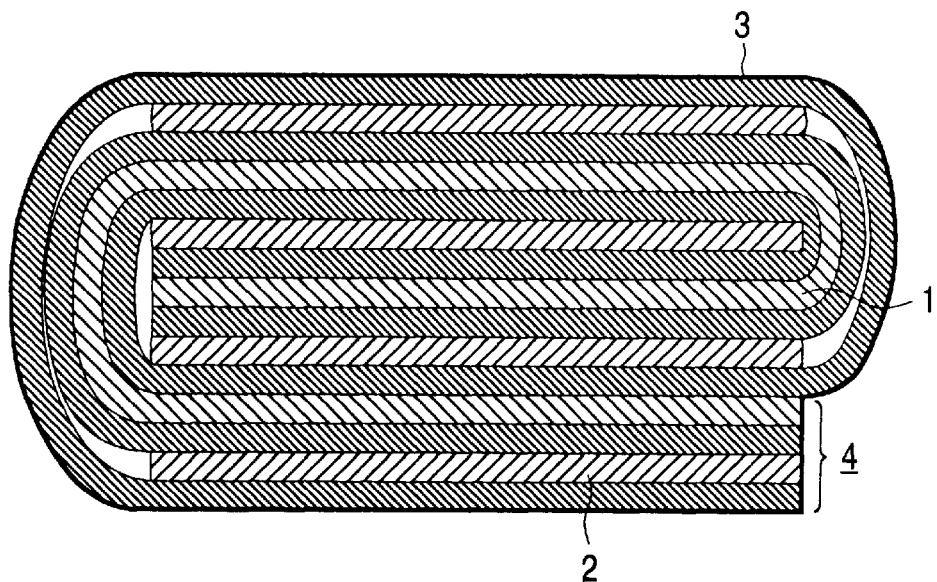
FIG. 3 is a schematic sectional view illustrating the multi-layer structure of a further embodiment of the lithium ion battery according to the present invention.
Figure 4:
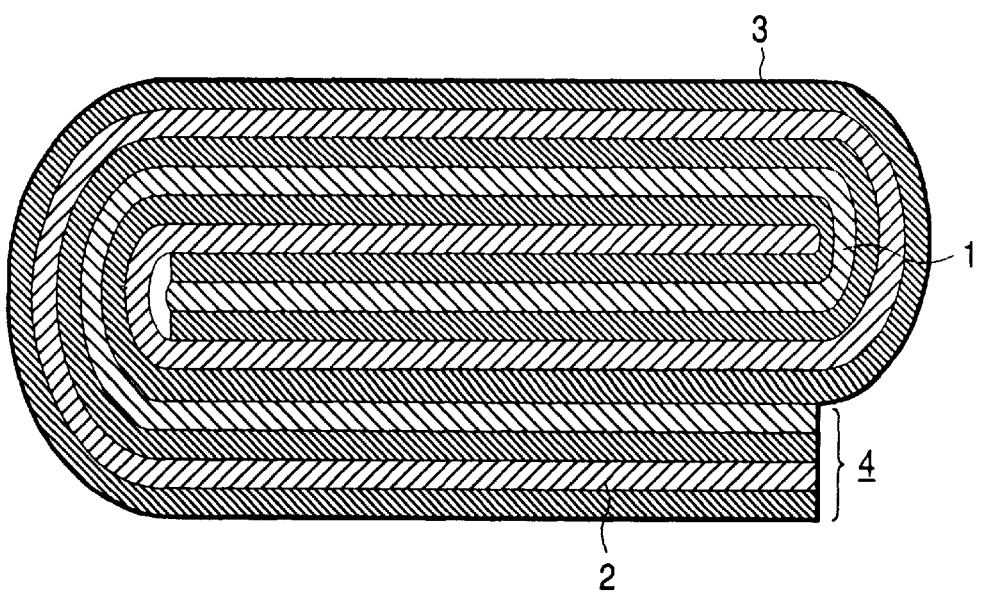
FIG. 4 is a schematic sectional view illustrating the multi-layer structure of a still further embodiment of the lithium ion battery according to the present invention.

Possible examples of the battery structure include one comprising a single electrode laminate having a separator laminated with an electrode as shown in FIG. 1, a flat laminated structure obtained by laminating a plurality of electrode laminates as shown in FIG. 2, and a multi-layer structure such as flat wound structure comprising a plurality of electrode laminates formed by ellipsoidally winding an electrode and a separator as shown in FIGS. 3 and 4. The present invention can secure safety and improve the charge-discharge efficiency. Accordingly, a safe and compact multi-layer structure battery having a high charge-discharge efficiency and a great capacity can be obtained as well.

The present invention will be further described in the following examples, but the present invention should not be construed as being limited thereto.

Embodiment 1–4

88 wt-% of $LiCoO_2$ as a positive electrode active material powder, 4 wt-% of a particulate polymer set forth in Table 1 as a particulate material comprising a polymer soluble in a nonaqueous electrolytic solution, and 8 wt-% of a graphite powder (KS-6, available from Lonza Japan Ltd.) as an electrically-conducting particulate material were mixed. The mixture was then mixed with a polyvinylidene fluoride as a binder resin to prepare a positive electrode active material mixture. The active material mixture thus obtained was then applied to an aluminum foil having a thickness of 20 $\mu$m as a collector to a controlled thickness of about 100 $\mu$m by doctor blade coating method to prepare a positive electrode.

96 wt-% of a mesophase microbead carbon (trade name; OSAKA GAS CO., LTD.) as a negative electrode active material powder, and 4 wt-% of a particulate polymer set forth in Table 1 as a polymer soluble in an electrolytic solution were mixed. The mixture was then mixed with a polyvinylidene fluoride as a binder resin to prepare a negative electrode active material mixture. The active material mixture was then applied to a copper foil having a thickness of 12 $\mu$m to a controlled thickness of about 100 $\mu$m by doctor blade coating method to prepare a negative electrode.

A separator (Cellguard #2400, available from Hoext Seraneed) was interposed between the two electrodes to prepare an electrode laminate. An electrolytic solution comprising lithium hexafluorophosphate as an electrolyte dissolved in a mixture of ethylene carbonate and 1,2-dimethoxyethane was then injected into the electrode laminate. During this procedure, the electrode laminate was held in place so that the components were not separated from each other. Extra electrolytic solution was wiped form the electrode laminae. The electrode laminate was packaged by an aluminum-laminated film, and then sealed to complete a battery.

In the battery thus prepared, the electrolytic solution formed a stable gel without liberating from the electrode depending on temperature or with time. The particulate polymethyl methacrylate used in Embodiments 1 and 2 had a small grain diameter and a low melting point and were dissolved even at ordinary temperatures and thus gelled the electrolytic solution. On the contrary, the particulate polyethylene glycol used in Embodiment 3 and the particulate polyacrylonitrile used in Embodiment 4 had a large grain diameter and could be difficultly dissolved at ordinary temperatures. Thus, after impregnation with the electrolytic solution, these compounds were dissolved at a temperature at which the polymers can be dissolved but the binder resin cannot be dissolved, i.e., 80° C.

These batteries were then evaluated for properties. As shown in Table 1, all these batteries exhibited a high electrical conductivity and a high energy density, demonstrating that the electrodes had been fairly filled with the gelled electrolytic solution free of bubbles, etc.

TABLE 1

|  | Particulate polymer (grain diameter) | Electrical conductivity | Energy density per weight |
| --- | --- | --- | --- |
| Embodiment 1 | Polymethyl methacrylate (0.35 $\mu$m) | $2 \times 10^{-5}$ S/cm | 120 Wh/kg |
| Embodiment 2 | Polymethyl methacrylate (0.25 $\mu$m) | $4 \times 10^{-5}$ S/cm | 120 Wh/kg |
| Embodiment 3 | Polyethylene glycol* (approx. 3 $\mu$m) | $5 \times 10^{-5}$ S/cm | 90 Wh/kg |
| Embodiment 4 | Polyacrylonitrile* (approx. 3 $\mu$m) | $2 \times 10^{-5}$ S/cm | 100 Wh/kg |

*Dissolved at 80° C. after impregnation with electrolytic solution

Embodiment 5

87 wt-% of $LiCoO_2$, 8 wt-% of a graphite powder (KS-6, available from Lonza Japan Ltd.), and 5 wt-% of a polystyrene powder as a binder resin were mixed. To the mixture thus obtained were then added toluene and 2-propanol in a proper amount to prepare a paste-like mixture. The paste-like mixture was then applied to an aluminum foil having a thickness of 20 $\mu$m as a collector to a controlled thickness of about 100 $\mu$m by doctor blade coating method to prepare a positive electrode.

95 wt-% of mesophase microbead carbon (trade name; OSAKA GAS CO., LTD.) and 5 wt-% of a polystyrene powder were mixed. To the mixture were then added toluene and 2-propanol in a proper amount to prepare a paste-like mixture. The paste-like mixture was then applied to a copper foil having a thickness of 12 $\mu$m as a collector to a controlled thickness of about 100 $\mu$m by doctor blade coating method to prepare a negative electrode.

The positive electrode and negative electrode thus prepared were then subjected to oscillation in a particulate polymethyl methacrylate having a grain diameter of 0.25 $\mu$m (available from Soken Chemical & Engineering Co., Ltd.) as a particulate material comprising a polymer soluble in a nonaqueous electrolytic solution. In this manner, the particulate polymer was introduced into voids in the positive electrode and negative electrode. The positive electrode and negative electrode comprising the particulate polymer incorporated therein were then assembled into a battery in the same manner as in the preceding embodiments. The battery thus prepared exhibited an electrical conductivity of $2 \times 10^{-5}$ S/cm and an energy density per weight of 120 Wh/kg, demonstrating that the electrodes had been fairly filled with the gelled electrolytic solution free of bubbles, etc.

In the present embodiment, the particulate polymethyl methacrylate as particulate polymer occurred in the electrode little toward the collector but much toward the other side. Thus, the distribution of the particulate polymer in the electrode showed a density gradient that it occurs less toward the collector side but much toward the other side. Accordingly, the electrolytic solution in the electrode showed higher gelation degree and concentration toward the surface thereof opposite the collector. In this arrangement, the battery exhibited improved charge-discharge characteristics as compared with batteries comprising an electrolytic solution uniformly distributed in the electrode with respect to gelation degree.

Embodiments 6–8

The same positive electrode and negative electrode as prepared in Embodiment 5 were dipped in a polymer solution soluble in a nonaqueous electrolytic solution set forth in Table 2, withdrawn, and then dried. If the polymer solution had a high viscosity, extra solution was wiped from the electrodes which had been withdrawn. In this manner, the polymer was introduced into voids in the positive electrode and negative electrode. The positive electrode and negative electrode comprising the polymer incorporated therein were then assembled into a battery in the same manner as in the preceding embodiment. As shown in Table 2, all these batteries exhibited a high electrical conductivity and a high energy density, demonstrating that the electrodes had been fairly filled with the gelled electrolytic solution free of bubbles, etc. The particulate polyethyl methacrylate used in Embodiment 7 had a great concentration and thus could be difficultly dissolved at ordinary temperatures. Thus, after impregnation with the electrolytic solution, the compound was dissolved at a temperature of 80° C.

The polymer distribution in the electrode could be graded as in Embodiment 5, making it possible to raise the gelation degree and concentration of the electrolytic solution in the electrode toward the surface of the electrode opposite the collector.

TABLE 2

| | Polymer solution | Electrical conductivity | Energy density per weight |
|---|---|---|---|
| Embodiment 6 | Polymethyl methacrylate (5 wt-% toluene solution) | $1 \times 10^{-5}$ S/cm | 100 Wh/kg |
| Embodiment 7 | Polymethyl methacrylate (15 wt-% toluene solution)* | $4 \times 10^{-6}$ S/cm | 90 Wh/kg |
| Embodiment 8 | Polyethylene glycol (5 wt-% aqueous solution) | $5 \times 10^{-5}$ S/cm | 100 Wh/kg |

*Dissolved at 80° C. after impregnation with electrolytic solution

By externally introducing a polymer into an electrode formed by uniformly mixing the active material powder and particulate polymer as used in Embodiments 1 to 4 in the same manner as in Embodiments 5 to 8, the polymer can be incorporated in the electrode also on the collector side and the polymer distribution in the electrode can be graded as in Embodiments 5 to 8.

Embodiment 9

A piece having a predetermined size was stamped out of the same negative electrode and positive electrode as prepared in Embodiment 5 and a separator (Cellguard #2400, available from Hoext Seraneeds). These pieces were then repeatedly superimposed on each other to form a plurality of separator-negative electrode-separator-positive electrode laminates. Thus, a flat laminated battery as shown in FIG. 2 was prepared. Collector tabs connected to the edge of the positive electrode and the negative electrode in the flat laminated battery were then spot-welded to each other, respectively, to connect the foregoing flat laminated batteries in parallel to each other. An electrolytic solution comprising lithium hexafluorophosphate as an electrolyte dissolved in a mixture of ethylene carbonate and 1,2-dimethoxyethane was then injected into the battery. Extra electrolytic solution was then wiped from the battery. The battery was packaged by an aluminum-laminated film. The battery was then sealed under reduced pressure in such a manner that no air layers were interposed between the electrodes to obtain a multi-layer battery.

As a result, a stable gel was formed without causing the electrolytic solution to be liberated from the electrodes depending on temperature or with time as in the single-layer battery of Embodiment 5. The battery exhibited a high electrical conductivity and a high energy density per weight, demonstrating that the electrodes had been fairly filled with the gelled electrolytic solution free of bubbles, etc. Further, the multi-layer structure provided a compact lithium ion secondary battery having a raised capacity.

Embodiment 10

The same belt-like negative electrode as prepared in Embodiment 5 was interposed between two sheets of separators (Cellguard #2400, available from Hoext Seraneeds). One end of the separators having the negative electrode interposed therebetween was then folded by a predetermined amount. A positive electrode having a predetermined size prepared in the same manner as in Embodiment 1 was then inserted into the gap of the folded part. The laminate was then passed through a laminator. Subsequently, another sheet of the positive electrode having a predetermined size was placed on the position opposed to the foregoing positive electrode which had been inserted into the gap of the folded part. The foregoing belt-like separators were then ellipsoidally wound half round in such an arrangement that the latter positive electrode was interposed therebetween. The separator was further wound with a further sheet of the positive electrode being interposed therebetween. This procedure was then repeated to prepare a flat wound laminated battery having a plurality of electrode laminates as shown in FIG. 3. Collector tabs connected to the edge of the sheets of the positive electrode in the flat wound laminated battery were spot-welded to each other to electrically connect the plurality of electrode laminates in parallel to each other. An electrolytic solution comprising lithium hexafluorophosphate as an electrolyte dissolved in a mixture of ethylene carbonate and 1,2-dimethoxyethane was then injected into the battery. The battery was then packaged by an aluminum-laminated film. The battery was then sealed under reduced pressure in such a manner that no air layers were interposed between the electrodes to obtain a multi-layer battery. As a result, a compact lithium ion secondary battery having a high energy density, excellent charge-discharge properties, a high capacity and a high safety was obtained as in Embodiment 9.

The present embodiment has been described with reference to the procedure which comprises winding belt-like separators having a belt-like negative electrode inserted therebetween with a plurality of positive electrodes having a predetermined size being inserted between the gap thus formed. However, belt-like separators having a belt-like positive electrode inserted therebetween may be wound with a plurality of negative electrodes having a predetermined size being inserted between the gap thus formed.

Further, the present invention has been described with reference to the procedure which comprises winding separators. However, belt-like separators having a belt-like negative electrode or positive electrode inserted therebetween may be folded with a positive electrode or negative electrode having a predetermined size being inserted between the gap thus formed.

Embodiment 11

A belt-like negative electrode prepared in the same manner as in Embodiment 5 was interposed between two sheets of separators (Cellguard #2400, available from Hoext Seraneeds). A belt-like positive electrode prepared in the same manner as in Embodiment 1 was then placed on the outer surface one of the two sheets of separators protruding by a predetermined amount. The laminate was then passed through a laminator with one end of the positive electrode ahead by a predetermined amount, followed by the laminate of positive electrode, separator, negative electrode and separator, to form a belt-like laminate. Thereafter, the protruding positive electrode was folded. The laminate was then ellipsoidally wound in such a manner that the positive electrode thus folded was contained inside to prepare a flat wound laminated battery having a plurality of electrode laminates as shown in FIG. 4. An electrolytic solution comprising lithium hexafluorophosphate as an electrolyte dissolved in a mixture of ethylene carbonate and 1,2-dimethoxyethane was then injected into the battery. The battery was then packaged by an aluminum-laminated film. The battery was then sealed under reduced pressure in such a manner that no air layers were interposed between the electrodes to obtain a multi-layer battery. As a result, a compact lithium ion secondary battery having a high energy density, excellent charge-discharge properties, a high capacity and a high safety was obtained as in Embodiments 9 and 10.

The present embodiment has been described with reference to the procedure which comprises winding belt-like separators having a belt-like negative electrode interposed therebetween with a positive electrode placed on the outer side of one of the separators. However, belt-like separators having a belt-like positive electrode interposed therebetween may be wound with a negative electrode placed on the outer side of one of the separators.

In Embodiments 9 to 11, the number of laminates was varied. As a result, the battery capacity increased in proportion to the number of laminates. The use of the same electrodes as prepared in Embodiments 6 to 8 made it possible to obtain safe batteries having excellent charge-discharge properties and a high capacity as in Embodiments 9 to 11. Further, the use of electrodes having a gradient in the polymer distribution therein as in Embodiments 1 to 4 made it possible to further improve the charge-discharge properties of the battery.

In accordance with the first and second processes for the production of a lithium ion secondary battery of the present invention, which comprises using an active material mixture prepared by mixing an active material powder with a particulate material comprising a polymer soluble in a nonaqueous electrolytic solution to prepare an electrode comprising said active material powder and particulate material, assembling said electrode into a battery structure, and then injecting said electrolytic solution into said battery structure, a safe lithium ion battery comprising a low fluidity or gelled electrolytic solution and having an excellent charge-discharge efficiency can be easily obtained.

In accordance with the third method of producing a lithium ion secondary battery of the present invention, which comprises externally introducing a particulate material comprising a polymer soluble in a nonaqueous electrolytic solution into voids in the electrode before the assembly into a battery structure in the first production process, the following effects can be added to the foregoing effects. In some detail, the viscosity or gelation degree of the electrolytic solution can be changed depending on the site in the electrode. In this arrangement, the viscosity or gelation degree of the nonaqueous electrolytic solution in the electrode can be raised toward the separator, making it possible to further improve the charge-discharge properties of the battery.

The fourth to ninth method of producing a lithium ion secondary battery of the present invention comprises applying a solution of a polymer soluble in a nonaqueous electrolytic solution to the electrode or dipping the electrode in the polymer solution, and then drying the electrode before the assembly into a battery structure in the first production process to exert the same effects as in the second production process.

In accordance with the tenth and eleventh processes for the production of a lithium ion secondary battery of the present invention, which comprises externally introducing a particulate material comprising a polymer soluble in a nonaqueous electrolytic solution into voids in an electrode formed of an active material powder to prepare an electrode comprising said particulate material in voids, assembling said electrode into a battery structure, and then injecting said electrolytic solution into said battery structure, the viscosity or gelation degree of the electrolytic solution can be raised. Further, the viscosity or gelation degree of the electrolytic solution in the electrode can be raised toward the separator, making it easy to obtain a safe lithium ion battery having an excellent charge-discharge efficiency.

The twelfth method of producing a lithium ion secondary battery of the present invention comprises coating an electrode formed of an active material powder with or dipping said electrode in a solution of a polymer soluble in a nonaqueous electrolytic solution, drying said electrode, assembling said electrode into a battery structure, and then injecting said electrolytic solution into said battery structure to exert the same effects as in the tenth production process.

The first structure of the lithium ion secondary battery of the present invention comprises an electrode laminate comprising two opposing electrodes and a separator provided interposed therebetween, and a nonaqueous electrolytic solution retained in voids in the electrodes and the separator, characterized in that a gelling material is incorporated in the electrodes so that the viscosity or gelation degree of the nonaqueous electrolytic solution is higher toward the separator. In this arrangement, the difference in the doping and dedoping rates in the positive and negative electrode active material layers between on the separator side and inside the active material can be relaxed, making it possible to effectively use the active material inside the electrode and hence improve the charge-discharge efficiency of the battery.

The second to fifth structures of the lithium ion secondary battery of the present invention comprises a plurality of electrode laminates in addition to the first structure. This structure can provide a compact multi-layer structure lithium ion secondary battery having a high charge-discharge efficiency and a great capacity.

What is claimed is:

1. A method of producing a lithium ion secondary battery, which comprises the steps of:

preparing a positive electrode active material mixture by mixing a positive electrode active material powder with a particulate polymer soluble in a nonaqueous electrolytic solution;

preparing a negative electrode active material mixture by mixing a negative electrode active material powder with a particulate polymer soluble in a nonaqueous electrolytic solution:

forming a positive electrode comprising said positive electrode active material powder and said particulate polymer soluble in a nonaqueous electrolytic solution by coating the positive electrode active material mixture onto a metal substrate;

forming a negative electrode comprising said negative electrode active material powder and particulate polymer soluble in a nonaqueous electrolytic solution by coating the negative electrode active material mixture onto a metal substrate;

assembling said positive electrode and said negative electrode into an electrode laminate;

and then injecting said electrolytic solution into said electrode laminate.

2. The method of producing a lithium ion secondary battery according to claim 1, wherein said particulate polymer soluble in a nonaqueous electrolytic solution comprises at least one of methacrylic polymer, acrylic polymer, polyethylene glycol, polypropylene glycol, and a copolymer obtained by the copolymerization of these polymers with other monomers.

3. The method of producing a lithium ion secondary battery according to claim 1, further comprising the step of introducing the particulate polymer soluble in a nonaqueous electrolytic solution externally into voids in said positive electrode and said negative electrode before the step of assembling said positive electrode and said negative electrode into the electrode laminate.

4. The method of producing a lithium ion secondary battery according to claim 1, further comprising the steps of:

coating said positive electrode and said negative electrode with or dipping said positive electrode and said negative electrode in a solution of said polymer soluble in a nonaqueous electrolytic solution;

and then drying said coated positive electrode and said negative electrode before the step of assembling said positive electrode and said negative electrode into the electrode laminate.

5. The method of producing a lithium ion secondary battery according to claim 4, wherein said active material mixture further comprises a binder resin and the method further comprises the step of heating said positive electrode and said negative electrode at a temperature at which said particulate polymer soluble in a nonaqueous electrolytic solution melts and said binder resin does not melt.

6. The method of producing a lithium ion secondary battery according to claim 5, wherein said particulate polymer comprises at least one polymer selected from the group consisting of polyethylene glycol and polypropylene glycol and said electrodes are heated at 80° C.

7. The method of producing a lithium ion secondary battery according to claim 1, wherein a diameter of said particulate polymer is not larger than 20 $\mu$m.

8. The method of producing a lithium ion secondary battery according to claim 7, wherein a diameter of said particulate polymer is not larger than 5 $\mu$m.

* * * * *